United States Patent [19]

Harrington

[11] Patent Number: 4,952,764
[45] Date of Patent: Aug. 28, 1990

[54] ADJUSTABLE FIN BACON RACK FOR MICROWAVE OVEN

[76] Inventor: Lawrence S. Harrington, R.D. #3, Burgess Rd., Bennington, Vt. 05201

[21] Appl. No.: 343,680

[22] Filed: Apr. 27, 1989

[51] Int. Cl.⁵ .......................... H05B 6/80; A47J 37/04
[52] U.S. Cl. ...................... 219/10.55 E; 219/10.55 F; 99/DIG. 14; 99/444; 99/448
[58] Field of Search .................. 219/10.55 E, 10.55 F, 219/10.55 R; 99/DIG. 14, 441, 444, 448, 449

[56] References Cited

U.S. PATENT DOCUMENTS

| | | |
|---|---|---|
| 176,819 | 5/1976 | Thomas . |
| D. 188,501 | 8/1960 | Wood . |
| D. 259,010 | 4/1981 | Klatt . |
| D. 260,221 | 8/1981 | Lee . |
| D. 266,892 | 11/1982 | Ford . |
| 676,479 | 6/1901 | Wagner . |
| 1,899,682 | 3/1931 | Goldenberg . |
| 1,962,908 | 3/1932 | Pierson . |
| 1,988,871 | 3/1932 | Kennedy et al. . |
| 1,998,944 | 5/1934 | Spake . |
| 2,057,962 | 7/1935 | Mailhoit . |
| 2,924,168 | 2/1960 | Jamentz ................................ 99/449 |
| 3,096,707 | 7/1961 | Mills . |
| 3,113,505 | 9/1961 | Keppler . |
| 3,321,314 | 5/1967 | Jeppson ................................ 99/444 |
| 3,412,674 | 8/1967 | Ruth . |
| 3,466,998 | 8/1967 | Musgrove . |
| 3,517,606 | 8/1967 | Myles et al. . |
| 3,555,993 | 1/1971 | Garcia . |
| 3,713,379 | 1/1973 | Gordy . |
| 3,747,506 | 7/1973 | Belgard . |
| 3,845,266 | 10/1974 | Derby . |
| 3,854,023 | 12/1974 | Levinson . |
| 3,858,495 | 1/1975 | Gotwalt ................................ 99/449 |
| 3,941,968 | 3/1976 | MacMaster et al. . |
| 3,943,320 | 3/1976 | Bowen . |
| 3,946,187 | 3/1976 | Mac Master et al. . |
| 4,064,797 | 12/1977 | Forlani . |
| 4,074,102 | 2/1978 | Asen . |
| 4,112,833 | 9/1978 | Oda et al. ...................... 219/10.55 E |
| 4,121,510 | 10/1978 | Frederick . |
| 4,214,515 | 7/1980 | Kubiatowicz . |
| 4,272,663 | 6/1981 | Green ............................ 219/10.55 E |
| 4,343,978 | 8/1982 | Kubiatowicz . |
| 4,398,077 | 8/1983 | Freedman et al. . |
| 4,471,193 | 9/1984 | Walter . |
| 4,501,946 | 2/1985 | Nibbe et al. . |
| 4,559,869 | 12/1985 | Hogan . |
| 4,659,890 | 4/1987 | Viet . |

*Primary Examiner*—Philip H. Leung
*Attorney, Agent, or Firm*—Donald S. Holland

[57] ABSTRACT

A microwave cooking utensil is disclosed for increasing the usable volume of a microwave oven. The utensil includes a base pan, adjustable fins spanning an open top of the pan, and a cover that encloses the pan and fins during cooking. The adjustable fins have angular lugs protruding from their opposed ends that are detachably secured within receiving slots along top edges of the pan. The fins may be adjusted to different alignments in the slots to simultaneously function as a variably-sized, horizontal cooking surface; overlapping inclined supports for foods that do not need to be cooked horizontally; and vertical supports for draping strip-like food (e.g., bacon). During cooking the cover prevents the food from splattering the oven. The base pan, fins and cover all detach from each other for easy cleaning.

9 Claims, 3 Drawing Sheets

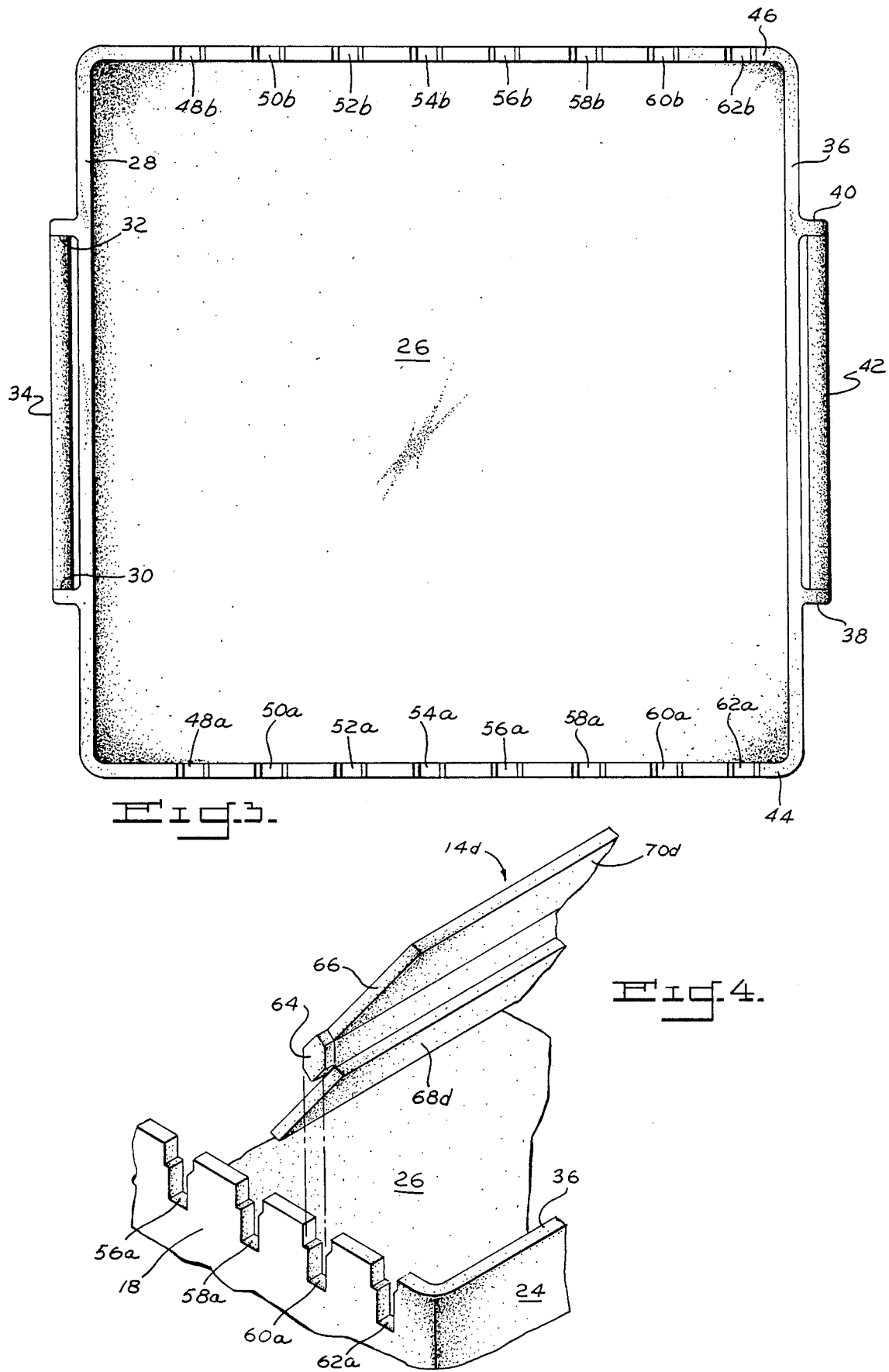

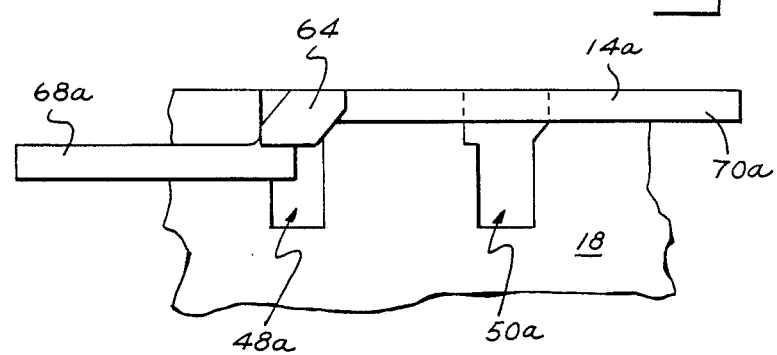
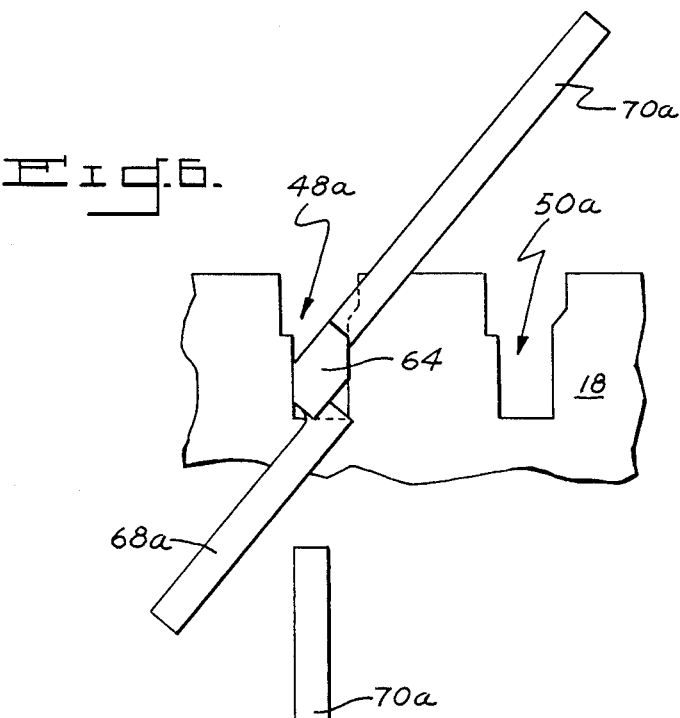
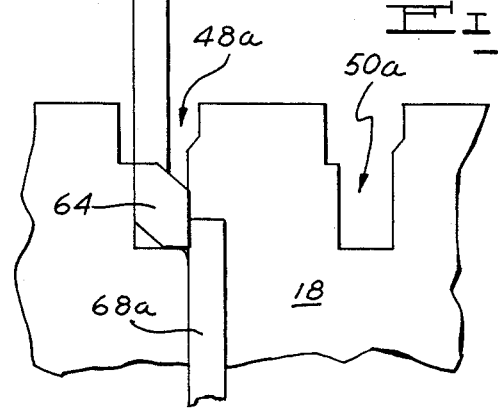

ADJUSTABLE FIN BACON RACK FOR MICROWAVE OVEN

BACKGROUND OF THE INVENTION

The present invention relates to cooking utensils for microwave ovens.

Microwave cooking has become increasingly popular in recent years because certain foods can be cooked more quickly in microwave ovens than in conventional gas or electric ovens. Microwave ovens cook foods by producing high frequency, electromagnetic energy fields within the oven enclosure. The energy fields cause the molecules making up the food to oscillate at a greater rate, thereby producing heat.

Unlike conventional ovens, the microwave oven is not pre-heated, and the temperature within the oven near the surface of the food being cooked is rarely high enough to "sear" or "brown" certain types of food. Therefore, microwave ovens have not replaced conventional ovens. Large meat foods, such as turkey, roast beef, ham and chicken, are rarely cooked in microwave ovens due to a lack of the type of surface coloration and texture that consumers expect.

Consequently, the majority of microwave ovens are utilized for quickly reheating foods, thawing out frozen foods and cooking a limited variety of certain types of foods. This has led to the sale of a great number of very small, inexpensive microwave ovens. Typically these are just a supplement to a conventional gas or electric oven. A very common size microwave oven cooking enclosure is approximately ten inches deep, ten inches wide, and six inches high.

The increasing prevalence of microwave ovens has produced an abundance of specially prepared frozen foods. Frequently entire meals, or portions, are frozen in special microwave transparent containers. Even various low-calorie, diet-type meals are available. Such frozen, microwave ready foods are typically ninety percent (90%) cooked; and the microwave oven thaws them out and finishes cooking them in a very short time.

Because of the large number of small microwave ovens and the increasing availability of foods specially designed for microwave cooking, a need exists for a cooking utensil that will maximize the cooking capacity of the limited volume of the great majority of microwave ovens.

Many utensils have been designed for enhancing the cooking of strip-types of foods, such as bacon. Typically, these have taken the form of raised "racks" which allow draping of the bacon over raised surfaces or between leaves or "fins". Most such devices raise the bacon so that grease produced during cooking drips down and away from the food. Coincidentally, because of the overlapping structure, some of the devices enable the user to cook more bacon or patty-type food than would be possible on a flat surface that is the same size as the bottom or resting surface of the raised bacon rack.

Some of the bacon racks are adapted or adaptable for use in microwave ovens. Most were initially designed to be inserted in conventionally heated ovens. They are frequently characterized as "bacon broilers".

While some of the previous cooking utensils could enhance the cooking efficiency of small microwave ovens, they are not being utilized in that capacity One reason is that their structures fail to offer the flexibility needed to cook more than one type of food at one time.

Moreover, such utensils are typically complex and intricate, having substantial cleaning and maintenance requirements that are incompatible with time-saving microwave cooking.

Accordingly, it is the primary object of the present invention to provide an adjustable fin bacon rack that allows strip, or patty-types of food to be cooked in greater numbers than on a comparably sized flat surface, while, at the same time, affording a variably sized flat surface for cooking other types of food.

It is another object to provide an adjustable fin bacon rack wherein the components that form the rack snap fit together to facilitate disassembly and cleaning.

It is yet another object to provide an adjustable fin bacon rack, commensurate with the aforementioned objects, which utilizes a food enclosing cover to prohibit liquid from splattering off the food being cooked and onto the surfaces of the oven enclosure.

The above and other objects and advantages of this invention will become more readily apparent when the following description is read in conjunction with the accompanying drawings.

SUMMARY OF THE INVENTION

A simple apparatus is disclosed for increasing the usable volume of a cooking enclosure of an oven. The device allows strip, or patty-types of food to be cooked in overlapping, non-horizontal alignment, while simultaneously affording a variably sized horizontal surface for cooking other types of food.

In the preferred embodiment, the invention comprises a base pan; a plurality of adjustable fins extending between side walls of the base pan; and a detachable cover that encloses the base pan. Angular lugs extend from opposed ends of the fins into receiving slots in upper edges of opposed side walls of the base pan. The lugs are angled such that they can fit into the receiving slots in one of three positions. Each position secures the fin in a specific angular alignment in relation to the upper edge of the side wall having the receiving slots. The angular alignments are zero degrees, fifty degrees or ninety degrees.

A user who has a variety of different types of food to cook at one time selects the number of fins that will best accommodate those types amenable to non-horizontal alignment, e.g., strip or patty-types of foods. The appropriate number of fins are then set in the corresponding receiving slots of the base pan side walls to span the base pan at a fifty-degree alignment. The remaining fins may then be set to span the base pan at zero degrees to hold those types of food which require a horizontal cooking surface, e.g., frozen pizza, or other frozen prepared dinners. Additionally, one or more fins may be set to span the base pan at ninety degrees. Certain types of strip food, e.g., bacon, can then be draped over the fin(s), in perpendicular alignment to the upper edge of the side wall.

Prior to cooking the food supported by the fins, the cover is placed over the fins and attached to the upper edges of the base pan. After the food is cooked, the cover easily detaches and the angular lugs slide up and out of their receiving slots, thereby freeing the fins from the base pan. The cover, fins and base pan can then be cleaned

BRIEF DESCRIPTION OF THE DRAWINGS

FIG. 3 is a top plan view of the base pan, showing receiving slots along the top edges of opposed side walls of the pan and handles affixed to top edges of other opposed side walls of the pan;

FIG. 4 is a fragmentary top perspective view of the adjustable fin bacon rack of FIG. 1, showing a fin displaced above a receiving slot in the upper edge of a side wall of the base pan with an angular lug extending from an end of the fin and broken lines indicating a path of insertion of the lug into the receiving slot;

FIG. 5 is a fragmentary side plan view of the base pan, receiving slot, fin and angular lug of FIG. 4, showing the lug inserted into the receiving slot such that the fin is rigidly held at a zero degree angle of alignment relative to the upper edge of the side wall of the base pan;

FIG. 6 is similar to FIG. 5, but shows the fin rigidly held at a fifty-degree angle of alignment relative to the upper edge of the side wall of the base pan; and FIG. 7 is similar to FIG. 6, but shows the fin rigidly held at a ninety-degree angle of alignment relative to the upper edge of the side wall of the base pan.

DETAILED DESCRIPTION OF THE PREFERRED EMBODIMENTS

Figure 1:
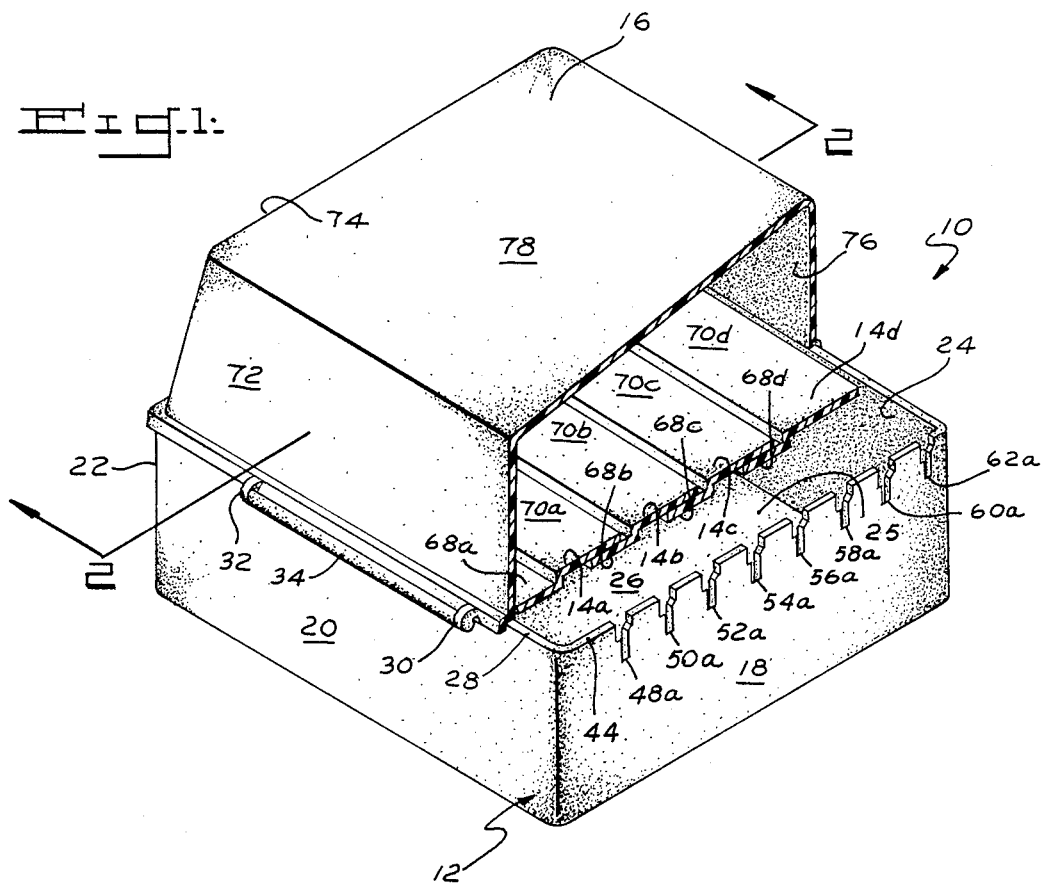
FIG. 1 a fragmentary top perspective view of an adjustable fin bacon rack constructed in accordance with the present invention, showing a base pan with fins and a detachable cover.

Referring to the drawings in detail, the preferred embodiment of an adjustable fin bacon rack is shown and generally designated by the reference numeral 10. As best shown in FIG. 1, the invention basically comprises a base pan 12, a plurality of identical, adjustable fins 14a,b,c,d that overlie the base pan 12 and a detachable cover 16 that encloses the base pan 12 and fins 14a–d during cooking.

The base pan 12, fins 14a–d and cover 16 are made of any suitable microwave transparent materials, such as polycarbonate resins of the type identified as LEXAN ® 181. (LEXAN ® is a trademark of the General Electric Company of Fairfield, Conn.)

Figure 2:
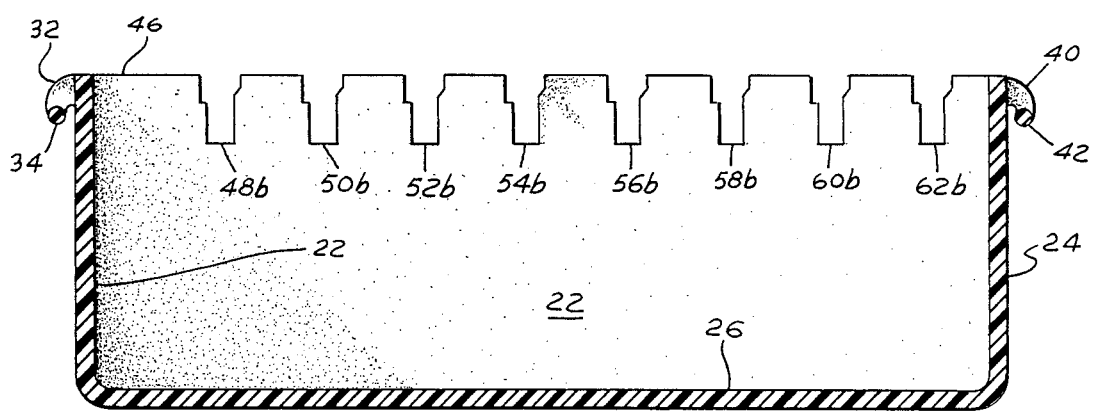
FIG. 2 is a side plan view taken along line 2—2 of FIG. 1, showing a side wall of the base pan with receiving slots along its upper edge.

As best shown in FIGS. 1–3, the base pan 12 includes four side walls 18, 20, 22, 24 which are attached to each other to define an enclosure 25. Interposed between the four side walls is a base plate 26. The side walls and base plate 26 form a box-like structure. A top edge 28 of side wall 20 has two handle caps 30, 32 extending away from the enclosure 25 formed by the four side walls 18,20,22,24. A handle bar 34 extends between, and is secured by, the handle caps 30, 32. A top edge of 36 of side wall 24 has handle caps 38, 40, extending away from the enclosure 25 formed by the side walls 18,20,22,24. Handle bar 42 extends between, and is secured by, handle caps 36, 38.

A top edge 44 of side wall 18 and a top edge 46 of opposed side wall 22 have aligned pairs of identical slot means or receiving slots 48a,b, 50a,b, 52a,b, 54a,b, 56a,b, 58a,b, 60a,b, 62a,b. (See FIG. 3.) As best shown in FIG. 4, those pairs of receiving slots are horizontally spaced apart, along the side walls. They receive and detachably secure identical angular lugs 64 (only one shown) that protrude from opposed ends 66 (only one shown) of the fins 14a–d.

As seen in FIGS. 5-7, the receiving slots 48a,b, 50a,b, 52a,b, 54a,b, 56a,b, 58a,b, 60a,b, 62a,b are structured in an approximate piston-like form to detachably secure the angular lugs 64 in one of three different angular alignments. The shape of the angular lugs 64 is approximately like a trapezoid whose nonparallel sides are broken by right angles such that the two sides of each right angle are parallel to the two sides of the opposed right angle.

Each identical fin 14a–d includes an "L"-shaped lower leaf 68a,b,c,d. A flat upper leaf 70a,b,c,d is connected to the foot portion of the lower leaves 68a–d and extends away from the lower leaves. The upper leaf 70a–d is approximately twice the width of the lower leaf. (See FIGS. 1, 5, 6.)

The cover 16 for the adjustable fin bacon rack 10 consists of four attached side walls (only three shown in FIG. 1) 72, 74, 76 and a top plate 78 interposed between the side walls 72, 74, 76. An attachment lip 80 is contiguous with the side walls and is adapted to detachably secure the cover to the top edges 28, 36, 44, 46 of the pan's side walls 18, 20, 22, 24 during cooking.

To utilize the adjustable fin bacon rack 10 for cooking, the cover 16 is first detached from the base pan 12. The fins 14a–d are then removed from the base pan 12 and the best alignment for each fin is determined depending upon the amount or type of food to be reheated, thawed out or cooked. For example, breakfast foods could require cooking bacon while simultaneously thawing out and/or cooking sausage patties. In that case, fin 14a could be inserted in receiving slots 48a,b and fin 14b in slots 52a,b with their angular lugs 64 securing the fins in a ninety-degree angle of alignment relative to the top edges 44, 46 of the side walls 18, 22 having the receiving slots, as in FIG. 7. The bacon strips (not shown) could then be draped over the top of fin 14a, with more strips draped over the top of fin 14b.

Fin 14c could then be inserted in receiving slots 54a,b and fin 14d in slots 60a,b with both fins at a zero degree angle of alignment, as in FIG. 5. Because of the overlapping nature of the fins 14a–d when they are in zero-degree alignment (see FIG. 1), maximum utilization of cooking space can be achieved. Fin 14c could not be inserted into receiving slots 54a,b unless fin 14b is in a non-zero degree alignment. When fin 14d is then inserted into receiving slots 60a,d, the normal overlap of the upper leaf 70c of fin 14c over the lower leaf 68d of fin 14d extends to provide the greatest area of nearly flat cooking surface available. This area is available to cook sausage patties, or other foods which need a relatively horizontal cooking surface.

For lunch-type of foods, fin 14a could be inserted into receiving slots 48a,b and set at a fifty-degree angle, as in FIG. 6. Frankfurt links (not shown) could be placed upon the lower and upper leaves 68a, 70a for thawing or cooking. Simultaneously, fin 14b could be inserted in receiving slots 50a,b, fin 14c in slots 56a,b and fin 14d in 60a,b all at a zero degree angle of alignment. That would provide a maximum horizontal surface for thawing out and/or cooking large flat foods, such as frozen pizzas (not shown). Isolating the frankfurt links from the flat food not only enhances space utilization, it also insures that liquid or grease type cooking by-products will not contact the food supported by the other fins.

Dinner type of foods frequently include prepared frozen foods in microwave transparent plastic bags.

Inserting all the fins 14a–d in their respective receiving slots (e.g., fin 14a in slots 48a,b; fin 14b in slots 52a,b; fin 14c in slots 56a,b; and fin 14d in slots 60a,b) such that they are at a fifty-degree alignment, as in FIG. 6, enables the bags of prepared foods to be placed upon each of the fins. Not only does such positioning enhance space utilization, it also encourages more even heating by providing space between the foods for the microwaves to pass and for the heat to evenly dissipate. Mere stacking of the foods in a pile could not achieve this.

Such frozen prepared foods often consist of only vegetable side dishes in relatively small containers, while some are complete meals. Moving the fins 14a–d to different receiving slots readily accommodates different size prepared food packages. For example, moving fin 14b to slots 50a,b creates a narrower cooking space between fins 14a and 14b and a much larger space between 14b and 14c.

The cover 16 is placed back on the base pan before the adjustable fin bacon rack is put into the oven.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. An apparatus for increasing the amount of food that can be cooked in an oven, comprising:
   a. a base pan having a bottom and side walls that define an open box-like enclosure;
   b. a plurality of fins that span an open top of the base pan, each fin having one end adjustably secured to a side wall of the base pan and the other end adjustably secured to an opposed side wall of the base pan, for supporting the food in different angles of alignment relative to the bottom of the base pan;
   c. a side wall of the base pan that includes a top edge that defines a plurality of adjacent receiving slots that are matched as pairs with aligned receiving slots in a top edge of an opposed side wall of the base pan, wherein each pair of receiving slots adjustably secures a fin; and
   d. angular lugs that have a cross-sectional structure in the approximate shape of a trapezoid whose nonparallel sides are broken by right angles such that the two sides of each right angle are parallel to the two sides of the opposed right angle, which angular lugs protrude from two opposed ends of the fins so that an angular lug protruding from one end is inserted into a receiving slot in a side wall and the angular lug protruding from the opposed end is inserted into an aligned receiving slot in an opposed side wall for adjustably securing the fin.

2. An apparatus for increasing the amount of food that can be cooked in an oven, comprising:
   a. a base pan having a bottom and side walls that define an open box-like enclosure;
   b. a plurality of fins that span an open top of the base pan, each fin having one end adjustably secured to a side wall of the base pan and the other end adjustably secured to an opposed side wall of the base pan for supporting the food in different angles of alignment relative to the bottom of the base pan, wherein each fin comprises a lower and upper leaf that are integrally affixed to each other with the lower leaf being approximately one-half the width of the upper leaf and with the fins designed such that the upper leaf of one fin will overlap the lower leaf of the adjacent fin when both fins are adjusted to be parallel to the bottom of the base pan;
   c. a side wall of the base pan that includes a top edge that defines a plurality of adjacent receiving slots that are matched as pairs with aligned receiving slots in a top edge of an opposed side wall of the base pan, wherein each pair of receiving slots adjustably secures a fin; and
   d. angular lugs that protrude from two opposed ends of the fins so that an angular lug protruding from one end is inserted into a receiving slot in a side wall and the angular lug protruding from the opposed end is inserted into an aligned receiving slot in an opposed side wall for adjustably securing the fin.

3. The apparatus of claim 2 wherein the base pan and fins include positioning means for variable placement of the fins.

4. The apparatus of claim 2 wherein the pairs of receiving slots on opposed side walls of the base pan exceed in number the number of fins so that when one fin is adjusted to a non-horizontal alignment, the adjacent horizontal fin can be inserted in the pair of receiving slots adjacent to the pair of receiving slots which secure the non-horizontal fin so that the remaining horizontal fins cover the maximum area of the top of the base pan.

5. The apparatus of claim 4 wherein the base pan and fins include adjustable securing means for securing the fins in either a zero, fifty or ninety degree angle of alignment relative to the bottom of the base pan.

6. An apparatus for increasing the amount of food that can be cooked in an oven, comprising:
   a. a base pan having a bottom and side walls that define an open box-like enclosure;
   b. a plurality of fins that span an open top of the base pan, each fin having one end adjustably secured to a side wall of the base pan and the other end adjustably secured to an opposed side wall of the base pan for supporting the food in different angles of alignment relative to the bottom of the base pan, wherein each fin comprises a lower and upper leaf that are integrally affixed to each other with the lower leaf being approximately one-half the width of the upper leaf and with the fins designed such that the upper leaf of one fin will overlap the lower leaf of the adjacent fin when both fins are adjusted to be parallel to the bottom of the base pan;
   c. a side wall of the base pan that includes a top edge that defines a plurality of adjacent receiving slots that are matched as pairs with aligned receiving slots in a top edge of an opposed side wall of the base pan, wherein each pair of receiving slots adjustably secures a fin and the pairs of receiving slots on the opposed side walls exceed in numbers the number of fins so that when one fin is adjusted to a non-horizontal alignment, the adjacent horizontal fin can be inserted in the pair of receiving slots adjacent to the pair of receiving slots which secure the non-horizontal fin so that the remaining horizontal fins cover a maximum area of the top of the base pan; and
   d. angular lugs that have a cross-sectional structure in the approximate shape of a trapezoid whose nonparallel sides are broken by right angles such that the two sides of each right angle are parallel to the two sides of the opposed right angle, which angular lugs protruding from two opposed ends of the fins so that an angular lug protrudes from one end is inserted into a receiving slot in a side wall and the angular lug protruding from the opposed end is inserted into an aligned receiving slot in an opposed side wall for adjustably securing the fin.

7. An apparatus for increasing the amount of food that can be cooked in an oven, comprising:
   a. a base pan having a bottom and side walls that define an open box-like enclosure;
   b. a plurality of fins that span an open top of the base pan, each fin having one end adjustably secured to an opposed side wall of the base pan, for supporting the food in different angles of alignment relative to the bottom of the base pan;
   c. a side wall of the base pan that includes a top edge that defines a plurality of adjacent receiving slots that are matched as pairs with aligned receiving slots in a top edge of an opposed side wall of the base pan, wherein each pair of receiving slots adjustably secures a fin; and
   d. angular lugs that protrude from two opposed ends of the fins so that an angular lug protruding from one end is inserted into a receiving slot in a side wall and the angular lug protruding from the opposed end is inserted into an aligned receiving slot in an opposed side wall for adjustably securing the fin.

8. An apparatus for increasing the amount of food that can be cooked in an oven, comprising:
   a. a base pan having a bottom and side walls that define an open box-like enclosure;
   b. a plurality of fins that span an open top of the base pan, each fin having one end adjustably secured to a side wall of the base pan and the other end adjustably secured to an opposed side wall of the base pan, by slot means for supporting the food in adjustable stationary angles of alignment relative to the bottom of the base pan, wherein the slot means define distinct pivot axes that are horizontally spaced apart and comprise a plurality of adjacent receiving slots that are matched as pairs with aligned receiving slots in top edges of opposed side walls of the base pan, wherein each pair of receiving slots secures a fin; and
   c. wherein the fins have angular lugs protruding from two opposed ends of the fins so that an angular lug protruding from one end is inserted into a receiving slot in a side wall and the angular lug protruding from the opposed end is inserted into an aligned receiving slot in an opposed side wall for adjustably securing the fin.

9. The apparatus of claim 8 wherein the base pan and fins are enclosed by a detachable cover during cooking.

* * * * *

UNITED STATES PATENT AND TRADEMARK OFFICE
CERTIFICATE OF CORRECTION

PATENT NO.   : 4,952,764

DATED        : AUGUST 28, 1990

INVENTOR(S) : LAWRENCE E. HARRINGTON

It is certified that error appears in the above-identified patent and that said Letters Patent is hereby corrected as shown below:

ON TITLE PAGE:
            The name of the inventor is LAWRENCE E.
    HARRINGTON.

Signed and Sealed this

Twenty-eighth Day of January, 1992

Attest:

HARRY F. MANBECK, JR.

*Attesting Officer*                *Commissioner of Patents and Trademarks*